US010034307B2

(12) United States Patent
Huang et al.

(10) Patent No.: US 10,034,307 B2
(45) Date of Patent: Jul. 24, 2018

(54) SPATIALLY GROUPED RANDOM ACCESS IN A WIRELESS NETWORK

(71) Applicant: Alcatel-Lucent USA Inc., Murray Hill, NJ (US)

(72) Inventors: Howard Huang, New York, NY (US); Harpreet Singh Dhillon, New York, NY (US); Harish Viswanathan, Murray Hill, NJ (US); Reinaldo Valenzuela, Holmdel, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 424 days.

(21) Appl. No.: 13/833,623

(22) Filed: Mar. 15, 2013

(65) Prior Publication Data

US 2014/0269532 A1    Sep. 18, 2014

(51) Int. Cl.
*H04W 74/08* (2009.01)
*H04W 74/00* (2009.01)

(52) U.S. Cl.
CPC ..... *H04W 74/0833* (2013.01); *H04W 74/006* (2013.01)

(58) Field of Classification Search
None
See application file for complete search history.

(56) References Cited

U.S. PATENT DOCUMENTS

| 6,330,459 | B1* | 12/2001 | Crichton et al. | 455/562.1 |
| 2007/0161385 | A1* | 7/2007 | Anderson | 455/502 |
| 2009/0225701 | A1* | 9/2009 | Kwon et al. | 370/328 |

FOREIGN PATENT DOCUMENTS

| WO | WO-2009025480 A1 | 2/2009 |
| WO | WO-2010093297 A1 | 8/2010 |
| WO | WO-2011097416 A1 | 8/2011 |
| WO | WO-2012148183 A2 | 11/2012 |

OTHER PUBLICATIONS

International Search Report dated Jun. 24, 2014 in corresponding PCT Application No. PCT/US2014/022335.

* cited by examiner

*Primary Examiner* — Christopher Crutchfield
*Assistant Examiner* — Alan Lindenbaum
(74) *Attorney, Agent, or Firm* — Harness, Dickey & Pierce, P.L.C.

(57) ABSTRACT

A method of enabling a plurality of user equipments (UEs) to transmit on random access channel (RACH). The method including transmitting, by an access point (AP), beacons to activate sets of UEs of the plurality of UEs based on a protocol, each of the sets of UEs containing UEs that are spatially co-located and each beacon associated with a different one of the sets of UEs.

16 Claims, 8 Drawing Sheets

SPATIALLY GROUPED RANDOM ACCESS IN A WIRELESS NETWORK

BACKGROUND OF THE INVENTION

Field

Example embodiments relate to a method of enabling a plurality of user equipments (UEs) to transmit on a random access channel (RACH), an access point (AP) configured to perform the same, a method of transmitting an access request on the RACH from a UE and a UE configured to perform the same.

Related Art

Conventionally, random access channels (RACHs) or propagation paths are used by one or more user equipments (UEs) to initiate access to a Universal Mobile Telecommunications System (UMTS) network.

In conventional UMTS networks, RACHs are transport channels, which carry data mapped from upper level logical channels (e.g., Open Systems Interconnect (OSI) Layers 3-7).

A requesting UE requests access to the UMTS network, using the RACH by transmitting a random access channel preamble to a serving access point (AP) at a desired power level. An initial transmission power level for the random access channel preamble is determined by the requesting UE, for example, using a measured pilot power in the downlink from the serving AP to the requesting UE.

The RACH is characterized by a fixed set of time and frequency resources. For a given transmission time interval, the frequency resources of the RACH are typically partitioned into orthogonal resources (for example, subbands or spreading codes). To communicate over the RACH, a UE transmits over one of these orthogonal frequency resource (for example, by randomly selecting one of the orthogonal frequency resources).

After transmitting an initial random access channel preamble to request access to the wireless network, the UE waits for an acknowledgement (ACK) or a negative acknowledgement (NACK) from the AP. If an acknowledgement is received within a time period, the UE transmits a subsequent data message. Alternatively, if the UE does not receive an acknowledgement, the UE transmits another random access channel preamble having an increased transmission power level, and in turn an increased energy value. The UE may repeat this procedure until an acknowledgement is received from the AP or the UE reaches a maximum allowed number of random access channel preambles transmitted in one access attempt.

The AP may fail to receive the random access channel preamble because the signal-to interference-plus noise ratio (SINR) is insufficient to detect the preamble. The SINR may be insufficient because, irrespective of the increased transmission power level, the signal strength of the preamble is too weak (e.g., the UE is located too far away from the AP). Further, the noise (e.g., interference) from other UEs within the cell may be interfering with the transmission of the preamble by the requesting UE. This interference would occur, for example, if the requesting UE and interfering UE transmit simultaneously on the same orthogonal frequency resource.

As the number of UEs in a cell increase, the probability of multiple UEs selecting the same frequency resource increases, and in this case the preambles transmitted by the multiple UEs may be indistinguishable at the AP.

SUMMARY OF THE INVENTION

One or more example embodiments enable a plurality of spatially co-located user equipments (UEs) to communicate on an uplink random access channel (RACH), based on a transmission of beacon signals by an associated access point (AP) and a protocol established between the UEs and the AP.

At least one example embodiment relates to a method of enabling a plurality of user equipments (UEs) to transmit on a random access channel (RACH).

In one embodiment, the method includes transmitting, by an access point (AP), beacons to activate sets of UEs of the plurality of UEs based on a protocol, each of the sets of UEs containing UEs that are spatially co-located and each beacon associated with a different one of the sets of UEs.

In one embodiment, the beacons are directional beams and the transmitting includes forming a first directional beam such that a first set of UEs of the plurality of UEs are activated; and forming a second directional beam such that the second directional beam activates a second set of UEs of the plurality of UEs, the second forming occurring at a different time from the first forming.

In one embodiment, the beacons are a plurality of directional beams and the transmitting includes forming a first plurality of directional beams such that UEs in at least two of the sets of UEs are activated at a same time; and forming a second plurality of directional beams such that the second polarity of directional beams activate at least two other of the sets UEs of the plurality of UEs, the second forming occurring at a different time from the first forming.

In one embodiment, the transmitting transmits the beacons omnidirectionally and each of the transmitted beacons is transmitted on a distinct resource.

In one embodiment, the protocol is preprogrammed in the plurality of UEs.

In one embodiment, the transmitting the beacons transmits beacons embedded with information indicating the protocol.

In one embodiment, the protocol indicates RACH resources and transmission times for the sets of UEs that receive the transmitted beacons to utilize in uplink transmissions to the AP on the RACH.

In one embodiment, the protocol indicates which locations are associated with the transmitted beacons.

In one embodiment, the method includes listening for access requests on the RACH resources from the plurality of UEs.

At least one example embodiment relates to an access point (AP) configured to enable a plurality of user equipments (UEs) to transmit on a random access channel (RACH).

In one embodiment, the AP includes a processor configured to transmit beacons, using a transmitter, to activate sets of UEs of the plurality of UEs based on a protocol, each of the sets of UEs containing UEs that are spatially co-located and each beacon associated with a different one of the sets of UEs.

In one embodiment, the beacons are directional beams and the processor is configured to perform the transmitting by, forming a first directional beam such that a first set of UEs of the plurality of UEs are activated, and forming a second directional beam such that the second directional beam activates a second set of UEs of the plurality of UEs, the second forming occurring at a different time from the first forming.

In one embodiment, the processor is configured to transmit the beacons omnidirectionally using the transmitter and each of the transmitted beacons is transmitted on a distinct resource.

In one embodiment, the processor is configured to perform the transmitting by transmitting the beacons embedded with information indicating the protocol.

In one embodiment, the protocol indicates RACH resources and transmission times for the sets of UEs that receive the transmitted beacons to utilize in uplink transmissions to the AP on the RACH.

In one embodiment, the protocol indicates which locations are associated with the transmitted beacons.

At least one example embodiment relates to a method of transmitting an access request on a random access channel (RACH) from a user equipment (UE).

In one embodiment, the method includes determining if a beacon from an access point (AP) is received based on a protocol; and transmitting an access request to the AP over a RACH resource at a transmission time determined based on the protocol associated with the beacon.

In one embodiment, the method includes determining the RACH resource and the transmission time using the protocol.

In one embodiment, the determining the RACH resource and the transmission time determines the RACH resource and the transmission time using the protocol and a location of the UE.

In one embodiment, the determining if a beacon has been received includes determining one of a frequency sub-band and a spreading code associated with a location of the UE using the protocol and a location of the UE.

In one embodiment, the method includes determining the location of the UE using a global positioning system (GPS).

At least one example embodiment relates to A User Equipment (UE) configured to transmit an access request on a random access channel (RACH).

In one embodiment, the UE includes a processor configured to, determine if a beacon from an access point (AP) is received based on a protocol, and transmit, using a transmitter, the access request to the AP over a RACH resource at a transmission time determined based on the protocol associated with the beacon.

In one embodiment, the processor is configured to determine the RACH resource and the transmission time using the protocol.

In one embodiment, the processor is configured to determine if the beacon has been received by determining one of a frequency sub-band and a spreading code associated with a location of the UE using the protocol and the location of the UE.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

Figure 1:
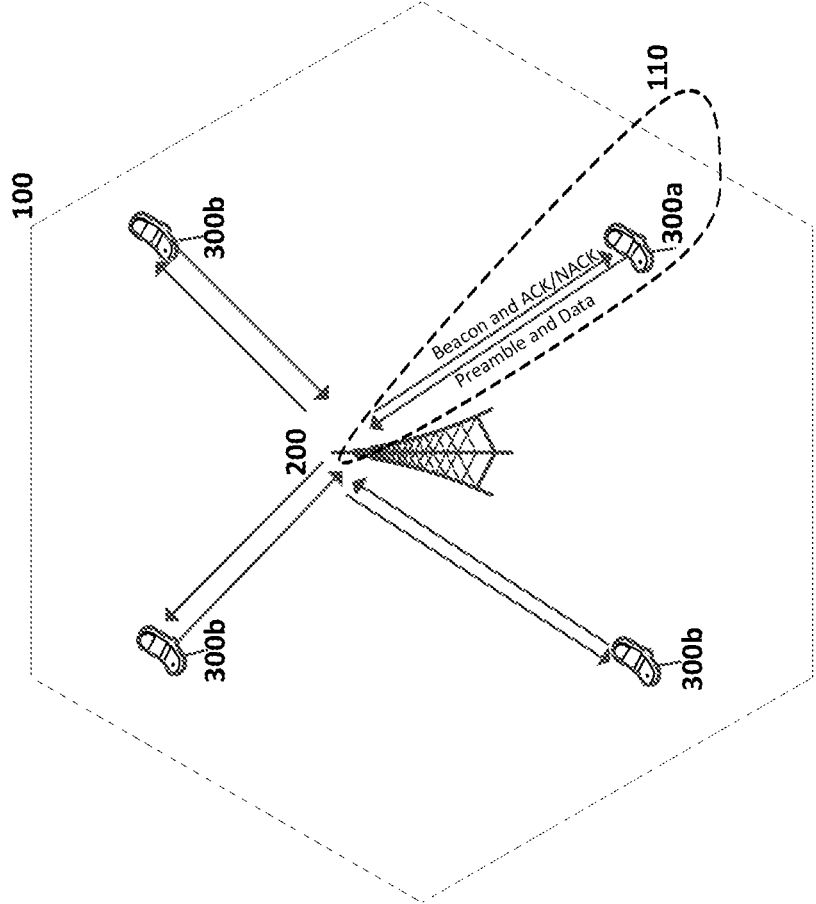
FIG. 1 illustrates a cell according to an example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF EXAMPLE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

In one or more example embodiments, uplink interference on the Random Access Channel (RACH) may be reduced by spatially separating user equipments (UEs) associated with an access point (AP) into sets of UEs that each contain UEs that are spatially co-located and controlling transmissions from each of the sets of UEs according to a protocol established between the UEs and the AP.

FIG. 1 illustrates a cell according to an example embodiment.

As illustrated in FIG. 1, a cell 100 includes a plurality of UEs 300a/300b communicating with an AP 200. The plurality of UEs 300a/300b include requesting UEs 300a that request establishment of a connection to the AP 200 over a random access channel (RACH) by transmitting a random access channel preamble and interfering UEs 300b whose transmissions may interfere with the transmitted preamble.

Figure 2:
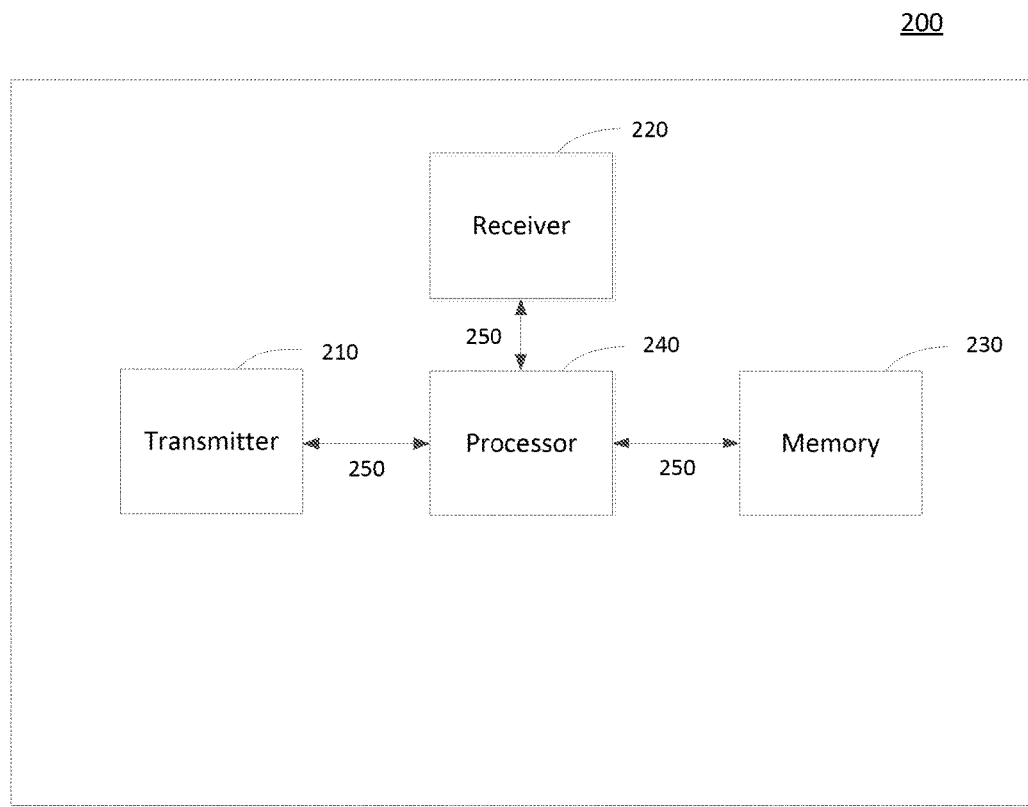
FIG. 2 illustrates an access point (AP) operating in the cell according to an example embodiment.

FIG. 2 illustrates an Access Point (AP) according to an example embodiment.

Referring to FIG. 2, the AP 200 may include, for example, a transmitter 210, a receiver 220, a memory 230 and a processor 240, that may communicate with each other over a data bus 250.

The transmitter 210 is a device that includes hardware and any necessary software for transmitting wireless signals including, for example, data signals, control signals, and signal strength or quality information via one or more wireless connections to other network elements in the wireless communications network.

The transmitter 210 may include one or more arrays of phased antenna elements that each create a directional beam. The phases of the antenna elements may be adjustable to create directional beams in different directions. Alternatively, the transmitter 210 may include an omni-directional antenna in which the transmitter includes antenna elements which radiate uniformly in all directions.

The receiver 220 is a device that includes hardware and any necessary software for receiving wireless signals including, for example, data signals, control signals, and signal strength or quality information via one or more wireless connections to other network elements in the network.

The memory 230 may be any device capable of storing data including magnetic storage, flash storage, etc. The memory may store a protocol which indicates the time and frequency resources for RACH transmission.

The processor 240 may be any device capable of processing data including, for example, a microprocessor configured to carry out specific operations based on input data, or capable of executing instructions included in computer readable code. The computer readable code may be stored on, for example, the memory 230.

Figure 3:
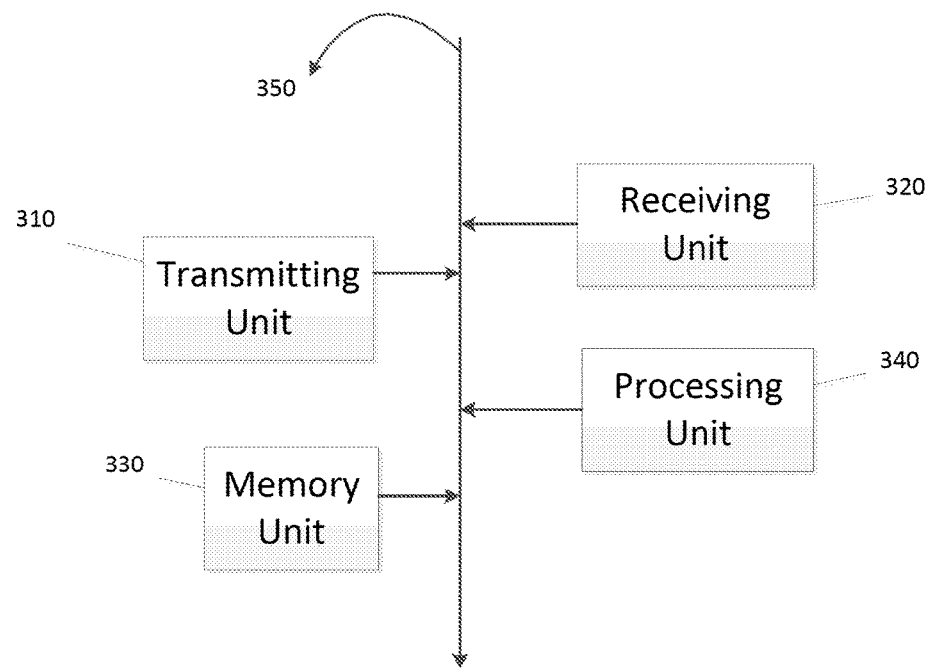
FIG. 3 illustrates user equipment (UE) configured to communicate with the AP according to an example embodiment.

FIG. 3 illustrates a user equipment (UE) 300a/300b according to an example embodiment. It should be also understood that the UEs 300a/300b may include features not shown in FIG. 3 and should not be limited to those features that are shown.

Referring to FIG. 3, the UEs 300a/300b may include, for example, a transmitting unit 310, a receiving unit 320, a memory unit 330, a processing unit 340, and a data bus 350.

The transmitting unit 310, receiving unit 320, memory unit 330, and processing unit 340 may send data to and/or receive data from one another using the data bus 350.

The transmitting unit 310 is a device that includes hardware and any necessary software for transmitting wireless signals including, for example, data signals, control signals, and signal strength/quality information via one or more wireless connections to other network elements in the wireless communications network 100.

The receiving unit 320 is a device that includes hardware and any necessary software for receiving wireless signals including, for example, data signals, control signals, and signal strength/quality information via one or more wireless connections to other network elements.

The memory unit 330 may be any device capable of storing data including magnetic storage, flash storage, etc. The memory unit 330 may store the protocol which indicates the time and frequency resources allocated for the RACH.

The processing unit 340 may be any device capable of processing data including, for example, a microprocessor configured to carry out specific operations based on input data, or capable of executing instructions included in computer readable code. The computer readable code may be stored on, for example, the memory unit 330.

Figure 4:
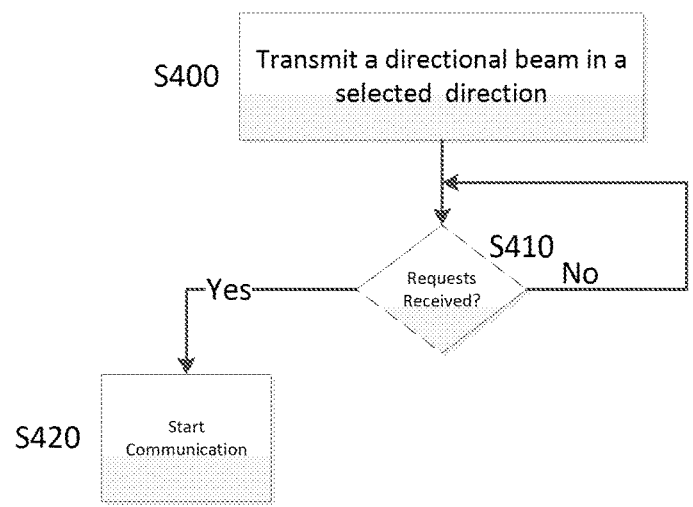
FIG. 4 illustrates a method of enabling a plurality of user equipments (UEs) to transmit on a random access channel (RACH) according to an example embodiment.

FIG. 4 illustrates a method of enabling a plurality of user equipments (UEs) to transmit on a random access channel (RACH) using a directional beam to selectively enable different UEs 300a/300b to transmit on the RACH using different RACH resources.

Referring to FIGS. 1, 2 and 4, in step S400, the processor 240 of the AP 200 may transmit a directional beam 110 via the transmitter 210 that contains a beacon signal. Because the beacon signal is a directional beam, only UEs 300a receiving the beacon signal above a desired threshold will have an opportunity to respond. As such, the beacon signal defines a set of UEs 300a and distinguishes this set of UEs 300a from potentially interfering UEs 300b. The potentially interfering UEs 300b do not receive the beacon signal above the desired threshold. Therefore, the potentially interfering UEs 300b do not have an opportunity to respond and interfere. Accordingly, the directional beam 110 may spatially separate which of the UEs 300a/300b are the requesting UEs 300a according to an angle between the UEs 300a/300b and the AP 200, a distance between the UEs 300a/300b and the AP 200, a proximity of the UEs 300a to interfering UEs 300b, or according to any other distinguishing criteria.

In step S410, the processor 240 determines if the receiver 220 receives access requests from the UEs 300a/300b. The access request may be in the form of a preamble transmitted over the RACH. However, because only UEs 300a receive the beacon signal transmitted in step S400, only UEs 300a in the same set transmit their access requests during a given RACH transmission time at a given RACH frequency resource. In contrast, potentially interfering UEs 300b do not transmit their respective preamble signals at the same transmission time using the same RACH frequency resource as the requesting UEs 300a because, for example, they lie outside the directional beam 110 and therefore any received beacon has a low SINR. The transmission time and the RACH resource may be determined according to a protocol.

In one embodiment, the AP 200 and the UEs 300a/300b may be preprogrammed with the protocol.

In another embodiment, the beacon signal may include protocol information embedded therein that provides the protocol. For example, the transmitter 210 may transmit the beacon in step S400 that includes the protocol information embedded within the beacon signal. In this case, if the UEs 300a/300b detect the transmission of the beacon, they may demodulate the information on the beacon to extract the protocol information.

The protocol indicates the relative transmission time and RACH resource that the UEs 300a/300b should use for transmitting their respective access requests to the AP 200. Using the protocol, the UEs 300a/300b can determine the relative transmission time and the RACH resource on which to send the uplink access request to the AP 200. The relative transmission time may be a time offset. For example, if the time off set is 1 time slot, then the UEs 300a may transmit their respective access requests 1 time slot after reception of the beacon signal. The RACH resource may be an orthogonal uplink resource (e.g., a frequency sub-band or spreading code).

In step S410, if the processor 240 does not receive an access request from the UEs 300a/300b, the processor 240 may continue to listen for future access requests.

However, if an access request is received, then in step S420, the processor 240 may initiate data communication with the respective one or more of the UEs 300a/300b. For example, the processor 240 may instruct the transmitter 210 to transmit an acknowledgement request (ACK) to the one or more UEs 300a/300b to indicate that the UEs 300a/300b may initiate data communication.

The processor 240 may repeat the process of enabling a plurality of user equipments (UEs) by transmitting another directional beam via the transmitter 220 in a different selected direction. The processor 240 may transmit in the different selected direction by adjusting the antenna elements of the transmitter 220 to transmit the directional beam in the different selected direction.

In one example embodiment, the processor 240 may instruct the transmitter 220 to simultaneously transmit a plurality of directional beams 110 in different directions that each contain the beacon signal. Accordingly, the plurality of directional beams 110 may spatially separate which of the UEs 300a/300b are the requesting UEs 300. The processor 240 may determine the different directions in such a way to minimize interference. For example, in one embodiment two different directional beams at 180° from each other may be transmitted.

Because the AP 200 controls the timing and resources used in uplink transmissions from sets of co-located UEs according to a protocol established between the UEs 300a/300b and the AP 200, example embodiments may reduce uplink interference on the Random Access Channel (RACH). Further, by forming the beacon as the directional beam 110, the AP 200 may extend the range of the beacon transmitted by the AP 200.

Figure 5:
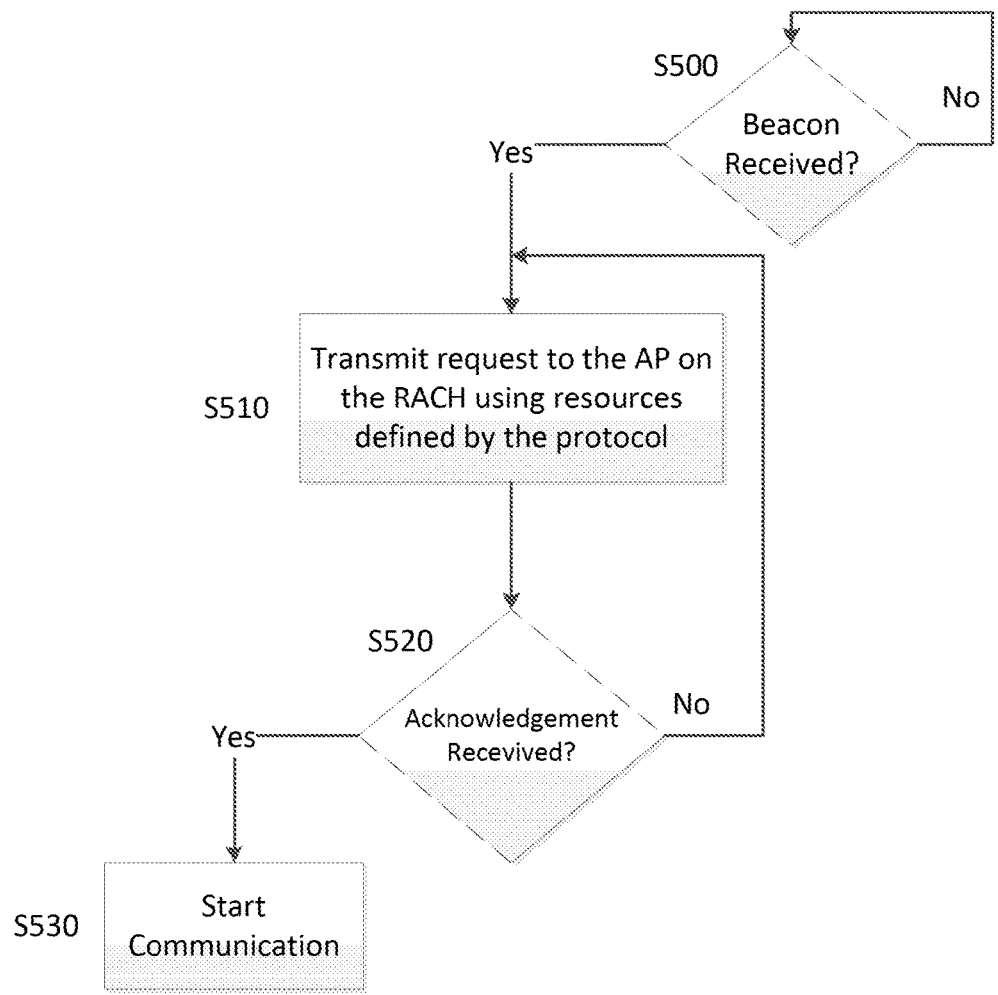
FIG. 5 illustrates a method of transmitting an access request on a random access channel (RACH) from a user equipment (UE) according to an example embodiment.

FIG. 5 illustrates a method of transmitting an access request from a user equipment (UE) to an access point (AP).

Referring to FIGS. 1, 3 and 5, in step S500, the processing unit 340 may determine if a beacon signal has been received by the receiving unit 320. For example, the processing unit 340 may determine if a beacon having a Signal to Interference plus Noise (SINR) ratio above a threshold has been received.

If in step S500, the processing unit 340 determines that a beacon signal has not been received, the processing unit 340 may instruct the receiving unit 320 to continue to listen for a beacon signal.

If in step S500, the processing unit 340 determines that the beacon signal has been received then in step S510, the processing unit 340 may instruct the transmitter 310 to transmit a request for access to the network. The access request may be transmitted to the AP 200 during a relative transmission time and on a RACH resource established by a protocol, as discussed above.

The protocol may indicate the relative transmission time and RACH resource that the UEs 300a/300b should use for transmitting their access requests to the AP 200. Using the protocol, the UEs 300a/300b can determine the relative transmission time and the RACH resource on which to send the uplink access request to the AP 200.

In one embodiment, the relative transmission time is a window, and the transmission time could be chosen randomly by the UE 300a within the window. In another embodiment, the relative transmission time may be a time offset. For example, if the time off set is 1 time slot, then the UEs 300a may transmit their respective access requests 1 time slot after reception of the beacon signal. Likewise, the transmission of the access request could occur randomly at any one of X transmission intervals immediately following the beacon, where X is an integer parameter established via the protocol. The RACH resource may be an orthogonal uplink resource (e.g., a frequency sub-band or spreading code).

In step S520, the processor 340 may listen for an acknowledgement (ACK) from the AP 200 indicating that the respective UE 300a/300b may commence data communication with the AP 200.

If the processor 340 does not receive the ACK from the AP 200, the processor 340 may continue to listen for the ACK from the AP 200 for a wait period. If the UE 300a/300b does not receive the ACK within the wait period, then the processor 340 may transmit another access request at an increased transmission power level by reverting back to step S510. The processor 340 may repeat the transmission step S510 and listening step S520 until the ACK is received from the AP 200 or a maximum allowed number of access requests are transmitted.

If the processor 340 receives the ACK from the AP 200, then in step S530 the processor 340 may commence data communication with the AP 200 over the transmitting unit 310.

Because the UEs 300a/300b are spatially grouped into co-located sets by the directional beam 110, each set of UEs 300a/300b transmit their access requests at respective transmission times and resources determined by the protocol. Therefore, example embodiments may reduce uplink interference on the Random Access Channel (RACH). Further, more UEs 300a/300b may be served by the AP 200 because the range of the beacon transmitted by the AP 200 may be extended by the use of the directional beam 110.

Figure 6:
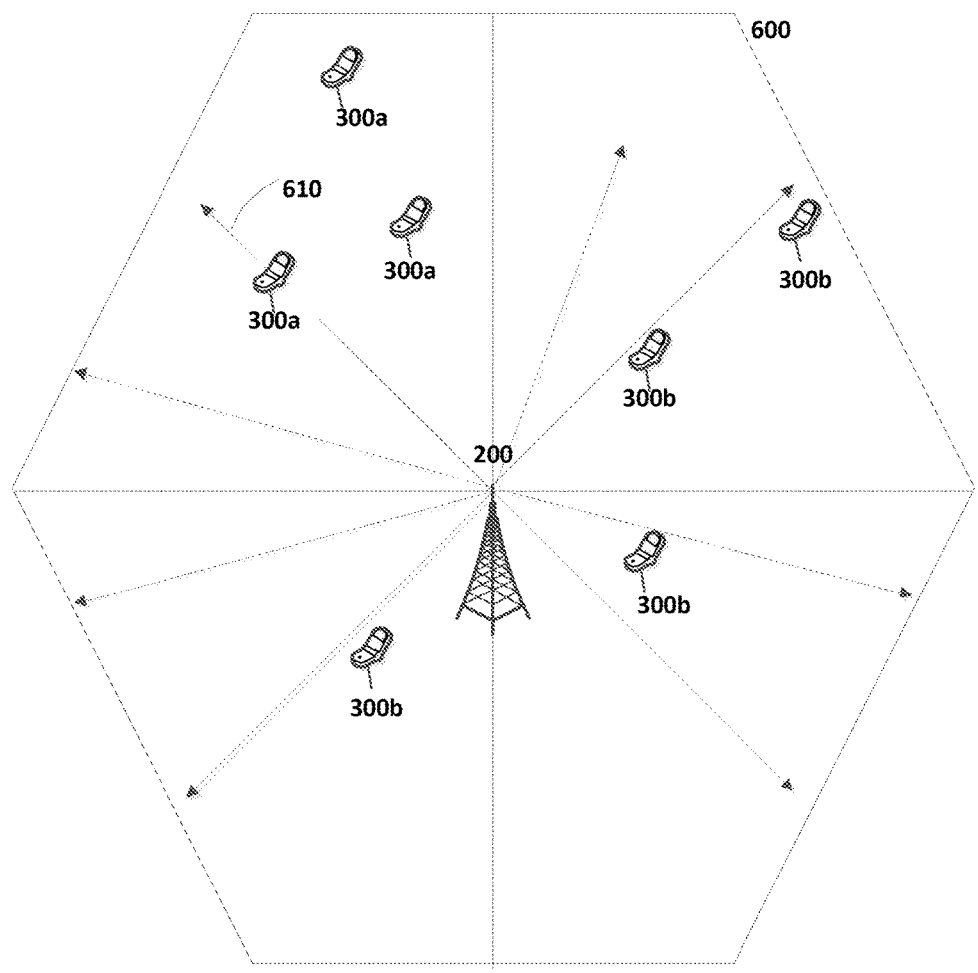
FIG. 6 illustrates a cell according to an example embodiment.

FIG. 6 illustrates a cell according to another example embodiment.

As illustrated in FIG. 6, a cell 600 includes a plurality of UEs 300a/300b configured to communicate with an AP 200. The plurality of UEs 300a/300b include requesting UEs 300a that request establishment of a connection to the AP 200 over a random access channel (RACH) by transmitting an access request and interfering UEs 300b whose transmissions may interfere with the transmitted access request. The AP 200 and the plurality of UEs 300a/300b have the same structure as the AP 200 and the plurality of UEs 300a/300b illustrated in FIGS. 1-3.

Figure 7:
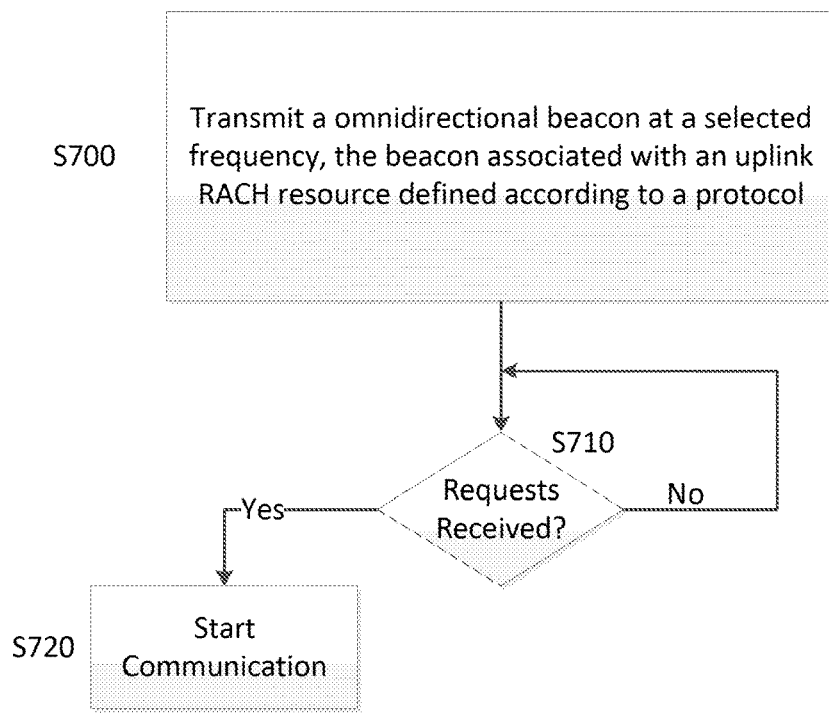
FIG. 7 illustrates a method of enabling a plurality of user equipments (UEs) to transmit on a random access channel (RACH) according to an example embodiment.

FIG. 7 illustrates a method of enabling a plurality of user equipments (UEs) to transmit on a random access channel (RACH) using an omni directional beacon to selectively enable different UEs 300a/300b to transmit on the RACH using different RACH resources.

Referring to FIGS. 2, 6 and 7, in step S700, the transmitter 210 of the AP 200 transmits an omnidirectional beacon 610 containing a beacon signal to a plurality of UEs 300a/300b. The transmitter 220 includes an omnidirectional antenna having antenna elements which radiate uniformly in all directions. Therefore, the plurality of UEs 300a/300b may all receive the beacon 610, irrespective of their location. However, the beacon 610 may be transmitted using a resource that is associated with a particular location. By associating different beacons with different geographic locations, the beacon 610 may define a set of UEs 300a that are spatially co-located in the particular location as a requesting set of UEs 300a and distinguish this set of UEs 300a from potentially interfering UEs 300b. Therefore, the UEs 300a/300b may be spatially separated into co-located sets without the use of a directional beam 110. A protocol may assign each beacon 610 to a particular geographic location.

In one embodiment the AP 200 and the UEs 300a/300b may be preprogrammed with the protocol.

In another embodiment, the beacon 610 may include protocol information that provides the protocol. For example, the transmitter 210 may transmit the beacon 610 in step S700 that includes the protocol information embedded within the beacon 610. In this case, if the UEs 300a/300b detect the transmission of the beacon 610, the UEs 300a/300b may demodulate the information in the beacon 610 to extract the protocol information.

The protocol may associate different geographic locations with different resources used to transmit the beacon 610. For example, the protocol may associate different frequency bands with different geographic locations. Alternatively, the protocol may associate different spreading codes with different geographic locations. Based on their location and using the protocol (as described with respect to FIG. 8 below), the UEs 300a/300b may determine whether they are associated with a particular received beacon signal 610.

In step S710, the receiver 220 listens for access requests from the UEs 300a/300b. However, because only UEs 300a within the geographic location are associated with the beacon signal 610, only UEs 300a transmit their respective access requests during a given RACH transmission time at a given RACH frequency resource. In contrast, potentially interfering UEs 300b do not transmit their respective preamble signals at the same transmission time using the same RACH frequency resource as the requesting UEs 300.

The transmission time and the RACH resource may be determined according to the protocol in the same manner as discussed above with respect to FIGS. 4 and 5. Therefore, the protocol may further indicate the relative transmission time and RACH resource that the UEs 300a/300b should use for transmitting their access requests to the AP 200. Using the protocol, the UEs 300a/300b can determine the relative transmission time and the RACH resource on which to send the uplink access request to the AP 200.

In one embodiment, the relative transmission time is a window, and the transmission time could be chosen randomly by the UE 300a within the window. In another embodiment, the relative transmission time may be a time offset. For example, if the time off set is 1 time slot, then the UEs 300a may transmit their respective access requests 1 time slot after reception of the beacon signal 610. Likewise, the transmission of the access request could occur randomly at any one of X transmission intervals immediately following the beacon, where X is an integer parameter established via the protocol. The RACH resource may be an orthogonal uplink resource (e.g., a frequency sub-band or spreading code).

The access request may be in the form of a preamble transmitted over a Random Access Channel (RACH).

Figure 8:
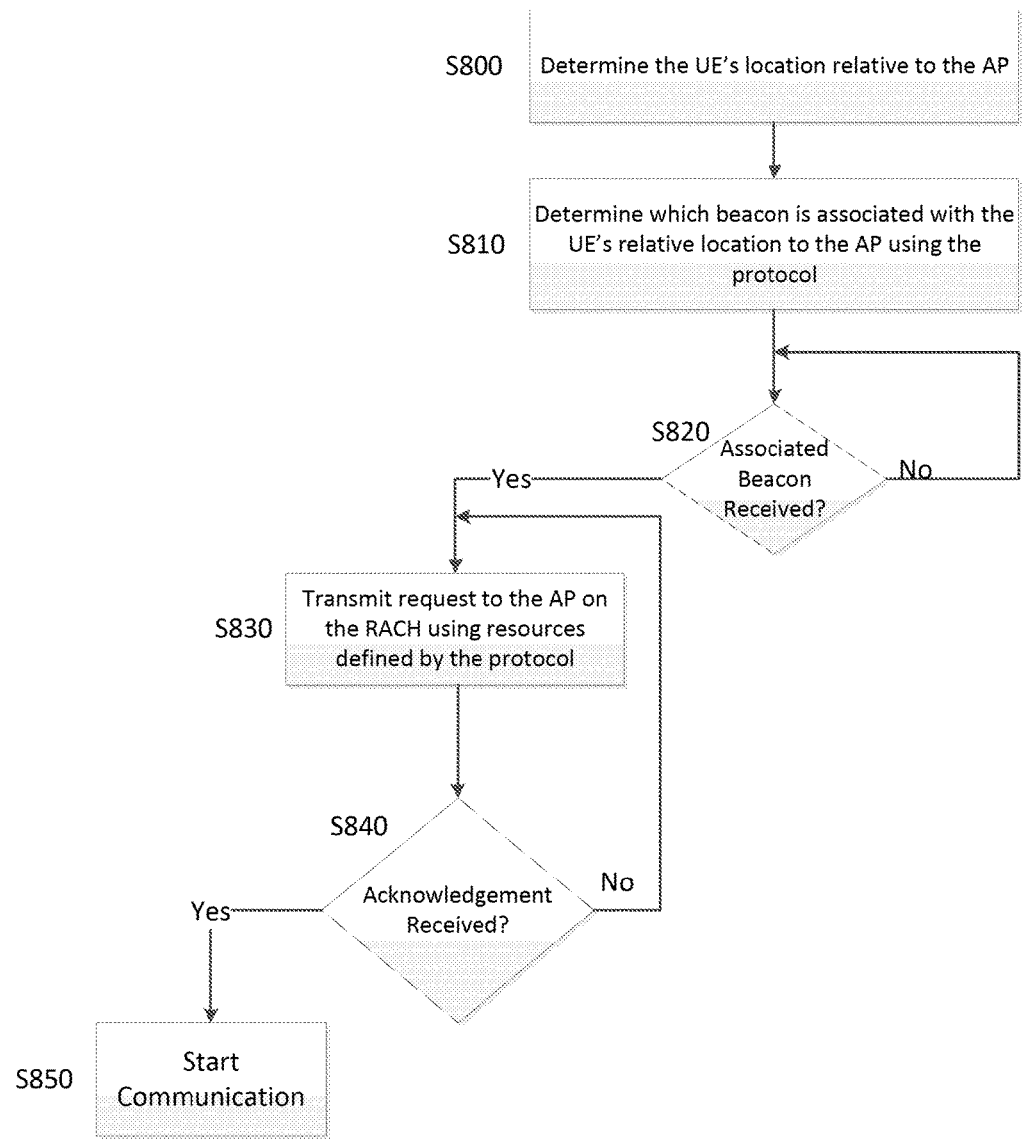
FIG. 8 illustrates a method of transmitting an access request on a random access channel (RACH) from a user equipment (UE) according to an example embodiment.

FIG. 8 illustrates a method of transmitting an access request on a random access channel (RACH) from a user equipment UE 300a/300b to an access point AP 200 associated with the method of FIG. 7.

Referring to FIGS. 3, 6 and 8, in step S800, the processing unit 340 of each of the UEs 300a/300b may determine the relative location of the UEs 300a/300b to the AP 200 so that the processing unit 340 can determine if a received beacon signal 610 is associated with the geographic location of the UE 300a/300b.

In one embodiment, to determine the relative location of the UEs 300a/300b, the memory unit 330 of each of the UEs 300a/300b may be preprogrammed with their location. For example, this embodiment may be used particularly with static UEs.

In another embodiment, the processing unit 340 of the UE 300a/300b may determine its respective current location using a Global Positioning System (GPS) receiver (not shown). Also, the UE 300a/300b may receive location information from the AP 200 instructing the UEs 300a/300b of the AP's 200 location. For example, the location information may be embedded in the beacon signal or transmitted via another signal.

The processing unit 340 may determine a relative location of the associated UE 300a/300b to the AP 200 using this location information of the AP 200 and the current location of the associated UE 300a/300b.

In step S810, the UEs 300a/300b may determine if the beacon 610 is a beacon for the UE using the UE's 300a/300b relative location of the UE 300a/300b to the AP 200 determined in step S810 and a protocol.

In one embodiment the UEs 300a/300b may be preprogrammed with the protocol.

In another embodiment, the beacon signal may include protocol information that provides the protocol. For example, the receiving unit 320 may receive the beacon 610 in step S820 that includes the protocol information embedded within the beacon 610. In this case, if the UEs 300a/300b detect the transmission of the beacon 610, the UEs 300a/300b may demodulate the information on the beacon 610 to extract the protocol information.

The protocol may associate different geographic locations with different resources used to transmit the beacon 610. For example, the protocol may associate different frequency bands with different geographic locations. Alternatively, the protocol may associate different spreading codes with different geographic locations. Using the protocol, the UEs 300a/300b may determine whether they are associated with a particular beacon 610. For example, referring to FIG. 6, the protocol may indicate that UEs 300a in the upper left quadrant of the cell 600 served by AP 200 are associated with a first frequency sub-band, UEs 300b in upper right quadrant of the cell 600 are associated with a second frequency sub-band, etc.

In step S820, the processing unit 340 may determine if a beacon 610 that is associated with the UE 300a/300b has been received by the receiving unit 320. For example, if the UEs 300a in the upper left guardant receive a beacon signal in the first frequency sub-band, then the processing unit 340 determines a beacon signal has been received.

If in step S820, the processing unit 340 determines that the beacon 610 associated with the relative location of the UE 300a/300b has not been received, the processing unit 340 may instruct the receiving unit 320 to continue to listen for the beacon 610 associated with the relative location of the UE 300a/300b.

If in step S820, the processing unit 340 determines that the beacon 610 has been received, then in step S830, the processing unit 340 may instruct the transmitter 310 to transmit a request for access to the network. The request may be transmitted to the AP 200 during a relative transmission time and on a RACH resource established by the protocol, in the same manner as discussed above with respect to FIGS. 4 and 5. In contrast, the potentially interfering UEs 300b do not transmit because they are not associated with the beacon 610.

The transmission time and the RACH resource may be determined according to the protocol, as described above with respect to FIGS. 4 and 5. Therefore, the protocol may further indicate the relative transmission time and RACH resource that the UEs 300a/300b should use for transmitting their access requests to the AP 200. Using the protocol, the UEs 300a/300b can determine the relative transmission time and the RACH resource on which to send the uplink access request to the AP 200.

In one embodiment, the relative transmission time is a window, and the transmission time could be chosen randomly by the UE 300a within the window. In another embodiment, the relative transmission time may be a time offset. For example, if the time off set is 1 time slot, then the UEs 300a may transmit their respective access requests 1 time slot after reception of the beacon signal. Likewise, the transmission of the access request could occur randomly at any one of X transmission intervals immediately following the beacon, where X is an integer parameter established via the protocol. The RACH resource may be an orthogonal uplink resource (e.g., a frequency sub-band or spreading code).

The access request may be in the form of a preamble transmitted over a Random Access Channel (RACH).

In step S840, the processor 340 may listen for an acknowledgement (ACK) from the AP 200 indicating that the respective UE 300a/300b may commence data communication with the AP 200.

If the processor 340 does not receive the ACK from the AP 200, the processor 340 may continue to listen for the ACK from the AP 200 for a wait period. If the UE 300a/300b does not receive the ACK within the wait period, then the processor 340 may transmit another access request at an increased transmission power level by reverting back to step S830. The processor 340 may repeat the transmission step S830 and listening step S840 until the ACK is received from the AP 200 or a maximum allowed number of access requests are transmitted.

If the processor 340 receives the ACK from the AP 200, then in step S850 the processor 340 may commence data communication with the AP 200 over the transmitting unit 310.

In one or more example embodiments, beacon signals are associated with locations based on the protocol and UEs within each location form co-located sets. Each co-located set of UEs 300a/300b transmit their access requests at respective transmission times and resources determined by the protocol. Therefore, example embodiments may reduce uplink interference on the Random Access Channel (RACH) by reducing the number of UEs that can transmit access requests on the RACH at a given time on a given resource to be fewer than the total population of UEs 300a/300b. Therefore, for a given set of RACH resources, the collision probability between access requests will be reduced. Further, because the UEs are spatially co-located, spatial processing such as coherent antenna combining can be used at the receiver 220 of the AP 200 to improve the detection probability.

While FIGS. 6-8 illustrate the protocol distributing the resources to geographic locations separated based on quadrants, it will be understood by one of ordinary skill in the art that the resources may be distributed in various ways without departing from the spirit and scope of example embodiments. For example, the resources may be distributed according to any angle between the UEs 300a/300b and the AP 200, a distance between the UEs 300a/300b and the AP 200, a proximity of the UEs 300a to interfering UEs 300b, or according to any other distinguishing criteria.

In one example embodiment, a hybrid method may be utilized where the transmitter 210 transmits a directional beam 110 that includes multiple beacons associated with different geographic locations. By providing multiple beacons in a directional beam 110, the AP 200 may further narrow which of the UEs 300a/300b are included in the set of requesting UEs 300.

While example embodiments have been particularly shown and described, it will be understood by one of ordinary skill in the art that variations in form and detail may be made therein without departing from the spirit and scope of the claims.

We claim:

1. A method of transmitting an access request on a random access channel (RACH) from a user equipment (UE), the method comprising:
    determining which one of a plurality of geographical locations are spatially associated with the UE based on information stored in a memory associated with the UE or based on global positioning information sent thereto;
    determining if an omnidirectional beacon from an access point (AP) received on one of a plurality of distinct downlink communication resources is associated with the UE based on a protocol and the one of the plurality of geographical locations determined as spatially associated with the UE, the protocol associating ones of the distinct downlink resources with one of the plurality of geographical locations and associating RACH resources and transmission times for uplink communication with ones of the plurality of geographical locations, the distinct downlink communication resources being at least one of discrete frequency bands and spreading codes associated with different ones of the plurality of geographical location, the omnidirectional beacon being received by other UEs that are geographically co-located with the UE; and
    transmitting, by an antenna associated with the UE, the access request to the AP over one of the RACH resources at one of the transmission times determined based on the geographical location of the UE and the protocol.

2. The method of claim 1, further comprising:
    determining the RACH resource and the transmission time using the protocol.

3. The method of claim 2, wherein the determining the RACH resource and the transmission time determines the RACH resource and the transmission time using the protocol and the one of the plurality of geographical locations associated with the UE.

4. The method of claim 3, further comprising:
    determining which one of of the plurality of geographical locations is associated with the UE using a global positioning system (GPS).

5. The method of claim 1, wherein the determining if the beacon has been received includes determining one of a frequency sub-band and a spreading code associated with a location of the UE using the protocol and the location of the UE.

6. A method of enabling a plurality of user equipments (UEs) to transmit on a random access channel (RACH), the method comprising:
    transmitting, by an antenna associated with an access point (AP), beacons omnidirectionally on distinct resources to enable sets of UEs of the plurality of UEs to transmit their respective access requests on a random access channel (RACH) based on a protocol and one of a plurality of geographical locations determined as spatially associated with a respective one of the sets of the UEs containing UEs that are spatially co-located in one of the plurality of geographical locations determined based on information stored in a memory associated with the UEs or based on global positioning information sent thereto, the protocol configured to associate each of the distinct resources with one of the plurality of geographical locations, the distinct resources being at least one of discrete frequency bands and spreading codes associated with different ones of the plurality of geographical locations such that each omnidirectional beacon that is transmitted with at least one of the discrete frequency bands and spreading codes is associated with a different one of the sets of UEs that are geographically co-located.

7. The method of claim 6, wherein the protocol is preprogrammed in the plurality of UEs.

8. The method of claim 6, wherein the transmitting the beacons transmits beacons embedded with information indicating the protocol.

9. The method of claim 6, wherein the protocol indicates RACH resources and transmission times for the sets of UEs that receive the transmitted beacons to utilize in uplink transmissions to the AP on the RACH.

10. The method of claim 6, further comprising:
    listening for access requests on the RACH from the plurality of UEs.

11. An access point (AP) configured to enable a plurality of user equipments (UEs) to transmit on a random access channel (RACH), the AP comprising:
- an antenna coupled to a transmitter; and
- a processor configured to instruct the antenna to transmit beacons omnidirectionally on distinct resources to enable sets of UEs of the plurality of UEs to transmit their respective access requests on a random access channel (RACH) based on a protocol and one of a plurality of geographical locations determined as spatially associated with a respective one of the sets of the UEs containing UEs that are spatially co-located in one of a plurality of geographical locations determined based on information stored in a memory associated with the UEs or based on global positioning information sent thereto, the protocol configured to associate each of the distinct resources with one of the plurality of geographical locations, the distinct resources being at least one of discrete frequency bands and spreading codes associated with different ones of the plurality of geographical locations such that each omnidirectional beacon that is transmitted with at least one of the discrete frequency bands and spreading codes is associated with a different one of the sets of UEs that are geographically co-located.

12. The AP of claim 11, wherein the processor is configured to perform the transmitting by transmitting the beacons embedded with information indicating the protocol.

13. The AP of claim 11, wherein the protocol indicates RACH resources and transmission times for the sets of UEs that receive the transmitted beacons to utilize in uplink transmissions to the AP on the RACH.

14. A User Equipment (UE) configured to transmit an access request on a random access channel (RACH), the UE comprising:
- an antenna coupled to a transmitter; and
- a processor configured to,
    - determine which one of a plurality of geographical locations are spatially associated with the UE based on information stored in a memory associated with the UE or based on global positioning information sent thereto,
    - determine if an omnidirectional beacon from an access point (AP) received on one of a plurality of distinct downlink communication resources is associated with the UE based on a protocol and one of the plurality of geographical locations determined as spatially associated with the UE, the protocol associating ones of the distinct downlink resources with one of the plurality of geographical locations and associating RACH resources and transmission times for uplink communication with ones of the plurality of geographical locations, the distinct downlink communication resources being at least one of discrete frequency bands and spreading codes associated with different ones of the plurality of geographical location, the omnidirectional beacon being received by other UEs that are geographically co-located with the UE, and
    - instruct the antenna to transmit the access request to the AP over one of the RACH resources at one of the transmission times determined based on the geographical location of the UE and the protocol.

15. The UE of claim 14, wherein the processor is configured to determine the RACH resource and the transmission time using the protocol.

16. The UE of claim 14, wherein the processor is configured to determine if the beacon has been received by determining one of a frequency sub-band and a spreading code associated with a location of the UE using the protocol and the location of the UE.

* * * * *